US008056759B2

(12) United States Patent  (10) Patent No.: US 8,056,759 B2
Spence  (45) Date of Patent: Nov. 15, 2011

(54) BIRD CARCASS CONTAINER

(76) Inventor: Randy Spence, Dover, DE (US)

( * ) Notice: Subject to any disclaimer, the term of this patent is extended or adjusted under 35 U.S.C. 154(b) by 343 days.

(21) Appl. No.: 12/453,556

(22) Filed: May 14, 2009

(65) Prior Publication Data

US 2010/0288786 A1  Nov. 18, 2010

(51) Int. Cl.
*B65D 43/26* (2006.01)
(52) U.S. Cl. ........ 220/828; 220/908; 220/264; 232/43.1
(58) Field of Classification Search ............... 220/263, 220/264, 828, 908; 232/19, 43.1, 47, 51; 221/194, 195
See application file for complete search history.

(56) References Cited

U.S. PATENT DOCUMENTS

| 3,875,902 | A |   | 4/1975  | Gasper         |
|-----------|---|---|---------|----------------|
| 4,020,793 | A |   | 5/1977  | Morrison       |
| 4,112,872 | A |   | 9/1978  | Van Huis       |
| 4,292,928 | A |   | 10/1981 | Kopylov et al. |
| 4,718,578 | A | * | 1/1988  | Radek et al. ............... 222/108 |
| 5,435,627 | A |   | 7/1995  | Fleming        |
| 6,703,234 | B1 |  | 3/2004  | Wadewitz       |
| 6,939,218 | B1 |  | 9/2005  | Holland        |
| 7,097,025 | B2 |  | 8/2006  | Haek et al.    |
| 2004/0245074 | A1 | | 12/2004 | Hawk et al.   |
| 2007/0026779 | A1 | | 2/2007  | Lang           |

FOREIGN PATENT DOCUMENTS

| CN | 2918272 | 7/2007 |
| SU | 760914 | 9/1980 |
| WO | WO 03/007721 | 1/2003 |

* cited by examiner

*Primary Examiner* — Anthony Stashick
*Assistant Examiner* — James N Smalley
(74) *Attorney, Agent, or Firm* — Richard C. Litman

(57) ABSTRACT

The bird carcass container includes a closed container body adapted to be mounted to a sidewall of a facility. A tubular extension or inlet extends from a side of the container body to the interior of the facility. The inlet includes an access door accessible from the facility interior so that users may deposit dead carcasses into the container body. A trap door is disposed on the bottom of the container body and selectively opened by a bracket actuator attached to the trap door. The door is maintained in a closed position by a system of counterweights. The bracket actuator is operated on by the bucket of a skid steer to open the trap door. The interior of the container includes sloping sides forming a chute towards the bottom of the container body. The rear side of the container may also include an access door.

10 Claims, 7 Drawing Sheets

007
BIRD CARCASS CONTAINER

BACKGROUND OF THE INVENTION

1. Field of the Invention

The present invention relates to waste disposal devices, and particularly to a bird carcass container for temporary storage of dead birds from a chicken house.

2. Description of the Related Art

Poultry, such as chickens, turkeys, ducks and geese, are a mainstay in the diets of many people around the world. The meat is relatively cheap and healthy for the consumer, and poultry is a source for other commonly used products, e.g., eggs and feathers. To meet the relatively large demands, any sizable farm has to raise and process significant numbers of poultry. In the process, there will inevitably be casualties among the poultry population, which, if not promptly disposed of, have the potential to cause widespread harm to the rest of the animals and ultimately to the consumers. A dead animal left for prolonged periods of time among the flock raises the potential for harmful bacterial growth, e.g., *salmonella*, botulism, and *camplylobacter*. This is more of a concern in today's climate where outbreaks of swine flu have surfaced.

To rid a facility of dead poultry, manual labor is commonly used to sweep the coop of the dead animals, where they are dumped in a centralized location or a bin. The resulting pile or bin must then be transported to a designated site to dump its contents for further processing. In the case of the former, the pile results in a disorganized mess that increases the time and effort required to remove the same, i.e., more physical strain on the manual labor and prolonged use of facility equipment, such as Bobcats™, skid steers or tractors. In the case of the latter, transporting the bin increases operational costs due to fuel and maintenance of the equipment.

Another method of disposal also requires manual labor, but a system of tracks and hooks are utilized to attach the dead carcass and automate delivery of the same to a disposal bin. While the above relieves some of the physical strain from the manual labor, the complexity, costs and maintenance of such a system may be unappealing to a majority of poultry farms with limited resources. It would be beneficial in the art to provide a means of disposing dead carcasses or wastes with minimal physical strain and more efficient use of facility equipment.

Thus, a bird carcass container solving the aforementioned problems is desired.

SUMMARY OF THE INVENTION

The bird carcass container includes a closed container body adapted to be mounted to a sidewall of a facility. A tubular extension or inlet extends from a side of the container body to the interior of the facility. The inlet includes an access door accessible from the facility interior so that users may deposit dead carcasses or wastes into the container body. A trap door is disposed on the bottom of the container body and is selectively opened by a bracket actuator attached to the trap door. The door is maintained in a closed position by a system of counterweights, and the bracket actuator is operated on by the bucket of a skid steer to open the trap door. The interior of the container includes sloping sides forming a chute towards the bottom of the container body. The rear side of the container may also include an access door.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
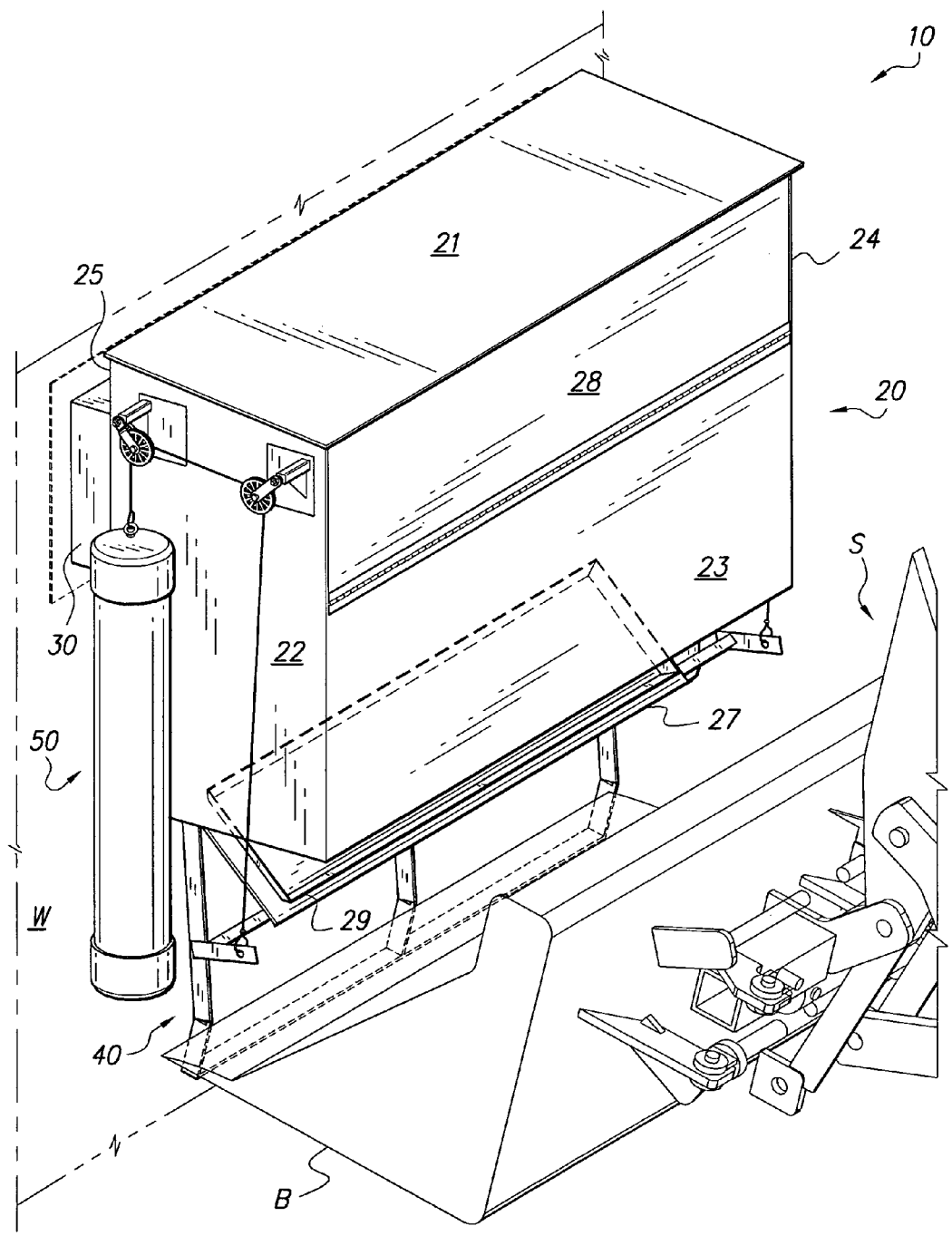
FIG. 1 is an environmental, perspective view of a bird carcass container according to the present invention.
Figure 2:
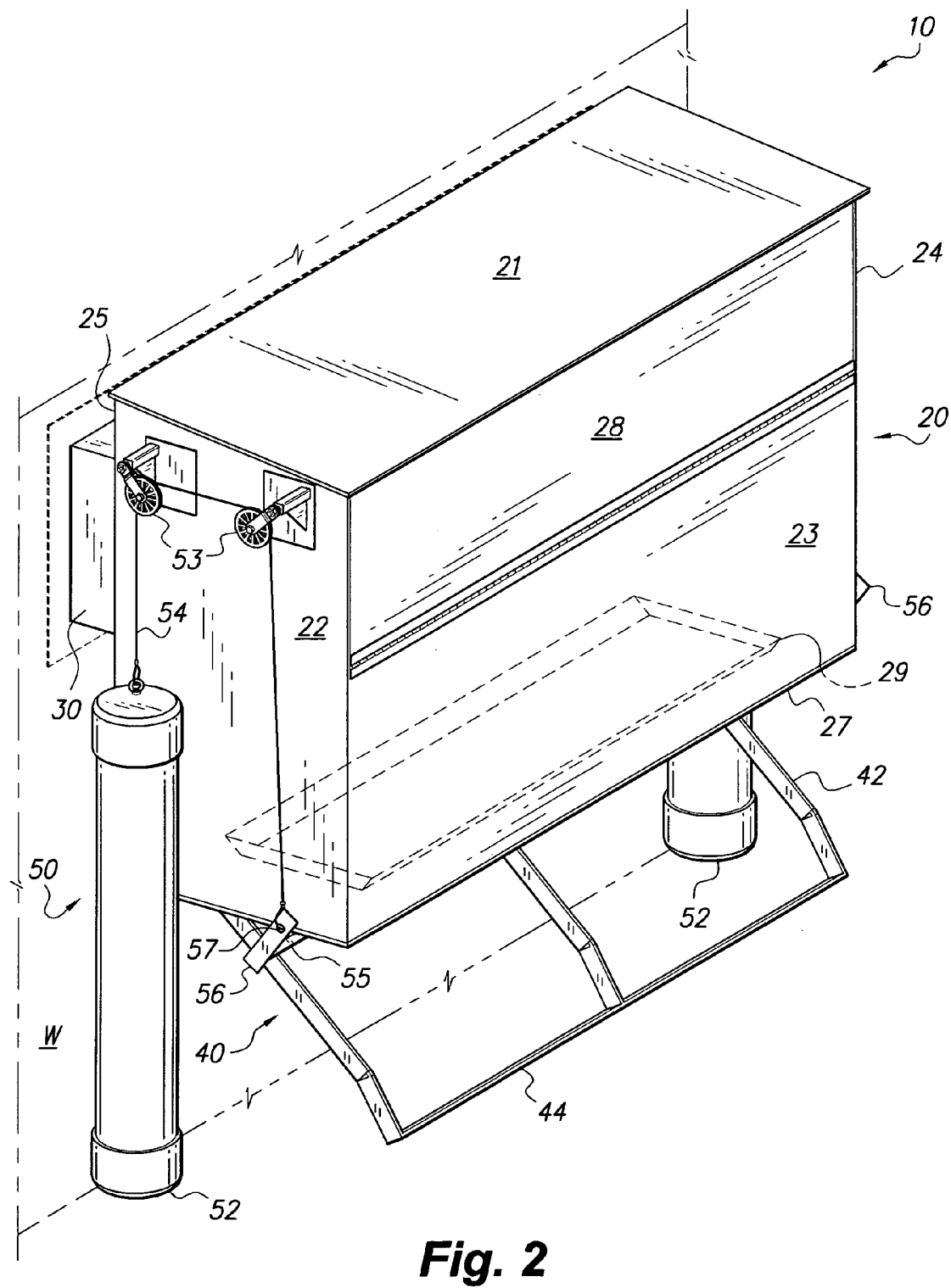
FIG. 2 is a perspective view of the bird carcass container according to the present invention.
Figure 3:
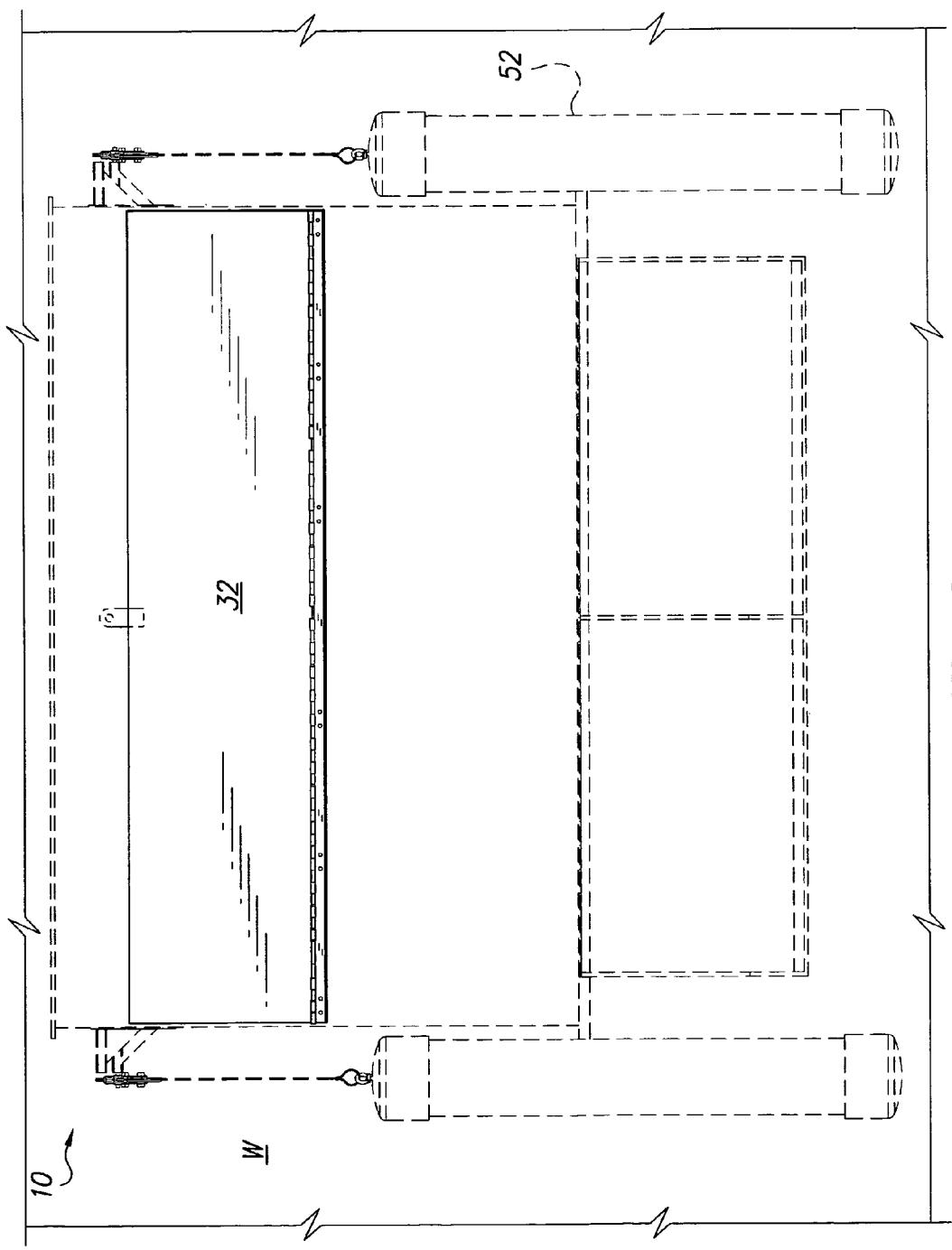
FIG. 3 is an environmental front view of the bird carcass container according to the present invention.
Figure 4:
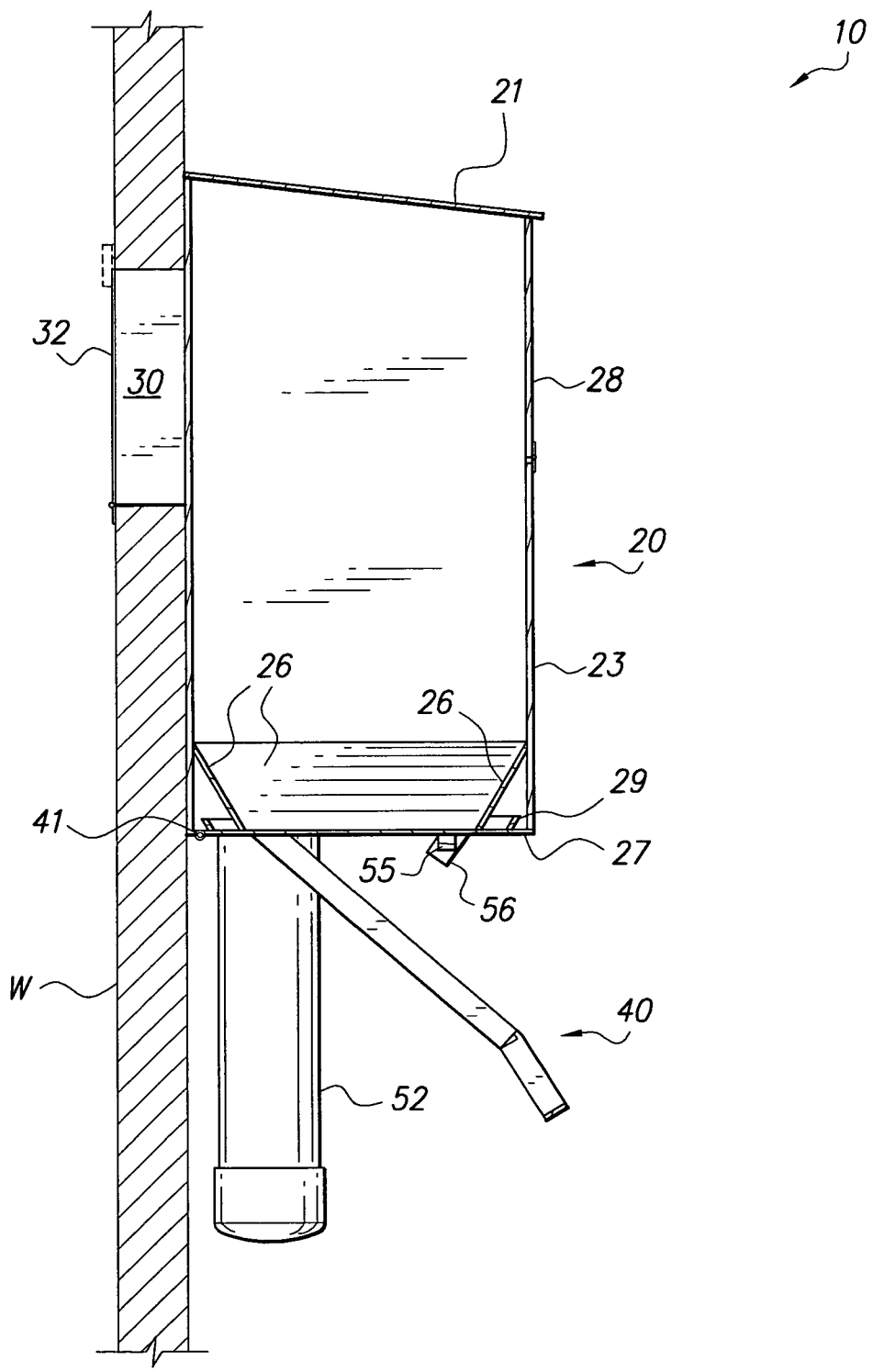
FIG. 4 is a side view of the bird carcass container according to the present invention.
Figure 5:
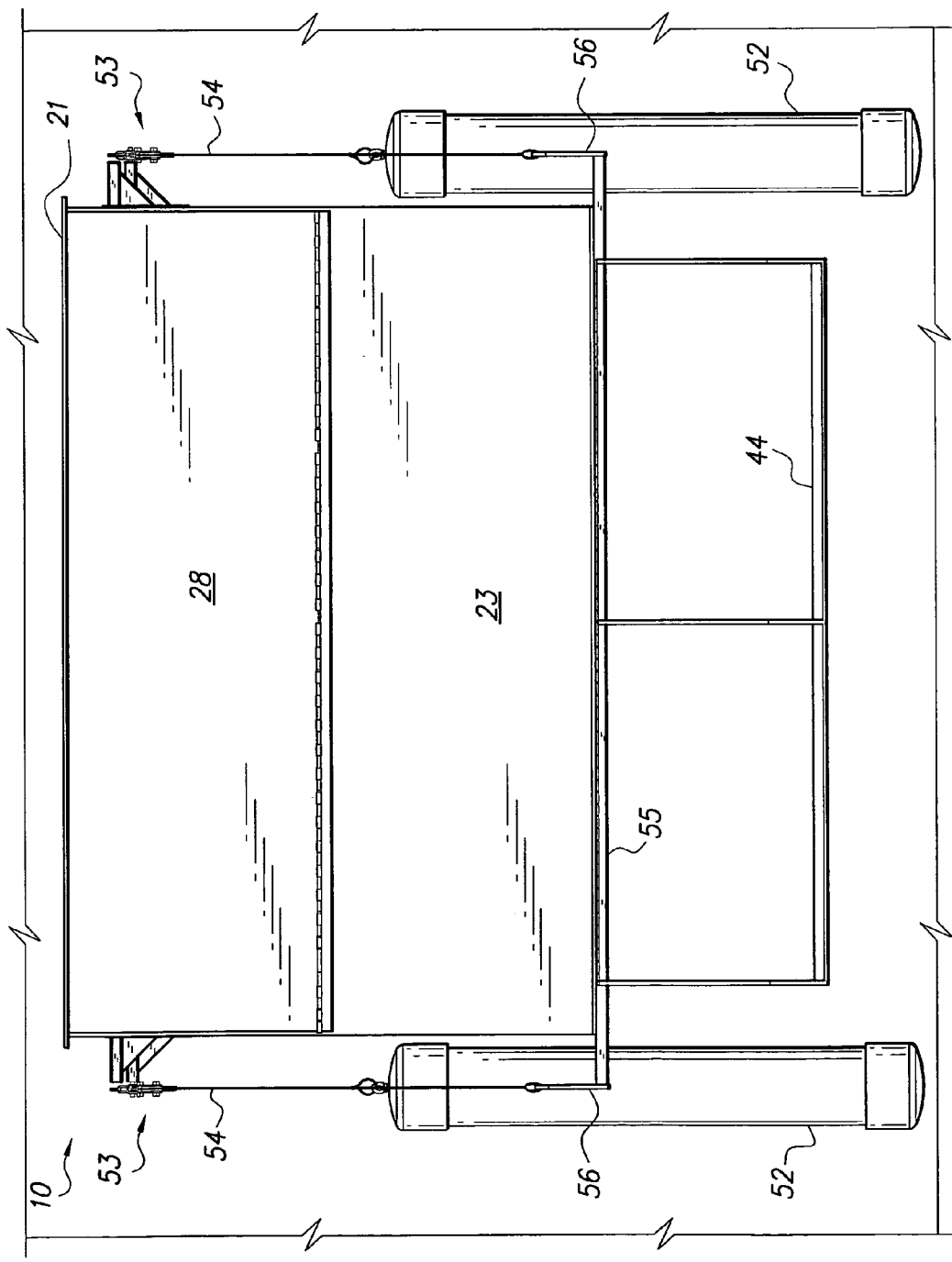
FIG. 5 is a rear view of the bird carcass container according to the present invention.

The present invention relates to a bird carcass container, generally referred to by reference numeral 10, that is configured for easy, temporary storage of bird carcasses and efficient disposal of the same. As shown in FIGS. 1-5, the bird carcass container 10 includes a substantially box-shaped container body 20 having a sloping top 21 and a selectively pivotal trap door 27 at the bottom. All the panels or walls of the carcass container 10 are preferably made from durable materials, such as steel, wood, plastics or composites thereof.

The bird carcass container 10 is adapted to be mounted to the sidewall W of a facility, e.g., a chicken house, a factory farm, a barn, etc., so that the interior of the container 10 may be accessed from the interior of the facility. To that end, the front side 25 of the container body includes a tubular extension or inlet 30 protruding therefrom. When properly mounted, the inlet 30 protrudes through the sidewall W of the facility and includes a hinged access door 32 (shown in FIG. 3) that a user may open to drop carcasses into the container body 20. The inlet 30 is preferably a rectangular box with an operative door, and although smaller in height and width, it is preferable that the length thereof matches the length of the container body 20. However, other dimensions and shapes may be used so long as the inlet 30 provides access to the interior of the container body 20. The access door 32 may be kept closed by a latch, magnetic lock or similar locking mechanisms.

The rear side 23 of the container body 20 (shown in FIG. 4) includes a hinged, rear access door 28 so that content inspections, selective disposals, and/or cleaning may be performed. Although the drawings show the rear access door 28 extending the length of the container body 20, other lengths and shapes are viable alternatives. The sloping top 21 may also be configured to include an access door as an additional means of accessing the interior of the container body 20. Either or both the top and rear access doors 28 may be kept closed with a latch, magnetic lock, or similar locking mechanisms.

Figure 6:
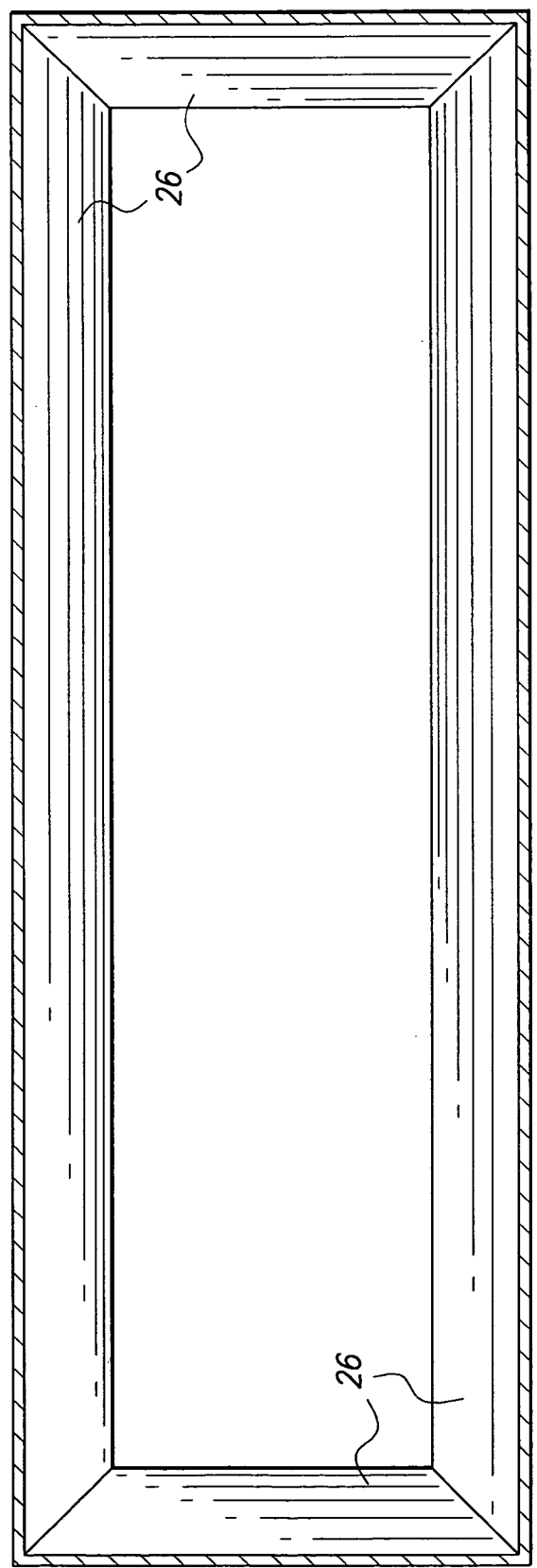
FIG. 6 is a top view in section of the bird carcass container according to the present invention.

As shown in FIG. 6, the lower section of the interior of the container body 20 includes sloping panels or walls 26 extending from respective sidewalls 22, 23, 24, 25 toward the top of trap door 27. These panels 26 define a chute, which directs the flow of the contents of the container body 20 toward the outlet or opening of the chute for disposal.

Referring to FIGS. 2-4, 7A and 7B, the bottom of the container body 20 includes a selectively actuated trap door or panel 27. The trap door 27 covers the opening or outlet of the chute and is mounted substantially flush with the bottom of the container body 20. The trap door 27 is pivotable about pivot 41 (shown in FIG. 4). A drip pan or cover 29 (shown in FIG. 4 and in phantom in FIG. 2) may be disposed atop the trap door 27 to catch any liquid matter that may be inside the bird carcass container 10, e.g., blood and/or decomposed effluvia, and thereby improve sanitary conditions in the whole disposal process. The drip pan 29 may be formed by angled strips of material welded onto the trap door 27. Alternatively, the trap door 27 may be molded to include the drip pan 29. The angular disposition of each strip corresponds or is parallel to sloping panels 26. As a result, the drip pan 29 forms a mating cap for the chute defined by the panels 26.

To operate the trap door, the bird carcass container 10 includes a bracket actuator 40 working in concert with a biasing mechanism 50. The bracket actuator 40 may be a rectangular framework of tubes disposed at an angle with respect to the trap door 27. One side of the bracket actuator 40 includes a bent section forming a lip or engaging member 44. The length of the bracket actuator 40 preferably corresponds to the length of the trap door 27, but smaller length bracket actuators may also be used. The other side of the bracket actuator 40 is attached to the trap door 27 at a point offset from the pivot 41. As a result, the bracket actuator 40 acts as an offset fulcrum for opening the door 27. The lip 44 is configured so that a bucket B of a skid steer S or similar equipment may engage the lip 44 to initiate forcible pivoting or opening of the trap door 27 by overcoming the opposition of the biasing mechanism 50, as shown diagrammatically in FIGS. 7A and 7B. In this embodiment, the biasing mechanism 50 includes a counterweight system comprising a pair of pulleys 53 mounted to each sidewall 22, 24. A cable, wire, cord, or rope 54 is attached at one end to a respective counterweight 52, then threaded through a respective pair of pulleys 53, and the other end is attached to an extension 56 on a stop bar 55 operatively attached to the trap door 27. The extension 56 includes an attachment hole 57 for the cable 54. The stop bar 55 has a length greater than the length of the container body 20 to effect the stop, i.e., to prevent the trap door 27 from pivoting further into the container body, and it may be rigidly or pivotally mounted to the bottom of the trap door 27. The combined weight of the counterweights 52 should be sufficient to keep the trap door 27 closed and contain the contents securely for a predefined capacity of the bird carcass container 10. Thus, it can be seen that the biasing mechanism 50 keeps the trap door 27 closed, and external forces are required to open the trap door 27.

Figure 7B:
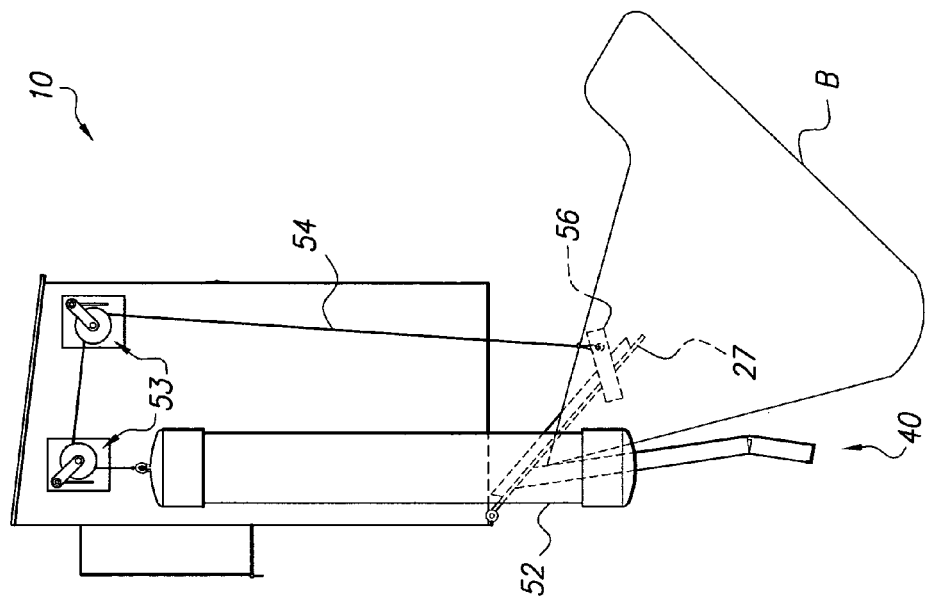
FIG. 7B is a schematic side view of the bird carcass container according to the present invention, shown with the trap door fully opened by the skid steer.
Figure 7A:
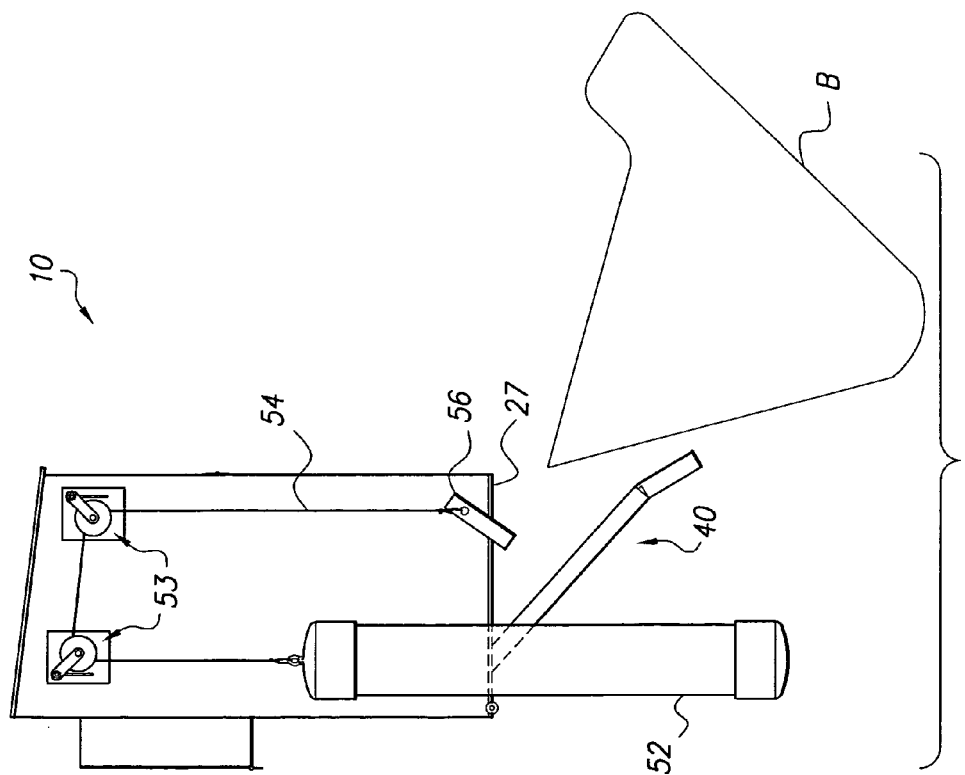
FIG. 7A is a schematic side view of the bird carcass container according to the present invention, shown prior to opening the trap door by a skid steer.

With reference to FIGS. 7A and 7B, the following describes how the bird carcass container 10 is used. Initially, workers will comb a facility for dead animals to be discarded into the container body 20 via inlet 30. When a predetermined capacity has been reached, a user operates a skid steer S and maneuvers the skid steer S so that the bucket B engages the lip 44 of the bracket actuator 40. The skid steer S is then driven further forward to overcome the weight of the counterweights 52 and thereby lower the trap door 27. The contents are released into the bucket, and the skid steer S is backed out of engagement with the bracket actuator 40. This action allows the counterweights 52 to close the trap door 27. If two or more of the bird carcass containers 10 are used, then they may be disposed on opposite ends of the facility to reduce travel distance for the workers.

Thus, it can be seen that the bird carcass container 10 is a more sanitary, safe, and efficient device for disposal of dead carcasses. The container 10 permits minimal handling and reduces operational costs for skid steers, tractor or similar facility equipment.

It is noted that the bird carcass container 10 encompasses a variety of alternatives. For example, the biasing mechanism 50 may include heavy-duty springs instead of the counterweight system. Moreover, the bird carcass container 10 is not limited to disposal of dead animals. It may be used for temporary storage of a variety of materials, as well as for wastes. For facilities where mounting of a bird carcass container 10 is not feasible or desired, the bird carcass container 10 may be supported in a freestanding manner that permits access to all the doors and the operation thereof. As a further alternative, the bird carcass container 10 may be painted and/or provided with indicia.

It is to be understood that the present invention is not limited to the embodiments described above, but encompasses any and all embodiments within the scope of the following claims.

I claim:

1. A bird carcass container, comprising:
   a closed container body having an inlet, an outlet, a front, a back, a bottom and sidewalls, wherein the inlet further comprises:
   i) a substantially rectangular tubular section extending outwardly from the front of the container body, the tubular section having an opening; and
   ii) an access door selectively covering the opening;
   a selectively actuated trap door disposed at the bottom of the container body in communication with the outlet, the trap door being rotatable about a pivot;
   a bias mechanism operatively attached to the trap door to retain the trap door in a closed position; and
   an offset fulcrum lever attached to the trap door;
   wherein operation of the offset fulcrum lever forces the trap door open to retrieve contents of the container body for further processing.

2. The bird carcass container according to claim 1, further comprising a rear access door on the back of said container body.

3. The bird carcass container according to claim 1, further comprising a chute formed at the bottom of said container body, the chute having an opening defining the outlet.

4. The bird carcass container according to claim 3, wherein said container body has angled panels extending from the front, the back and the sidewalls, the angled panels defining the chute.

5. The bird carcass container according to claim 1, wherein the biasing mechanism further comprises:
   at least one pulley attached to each of the sidewalls;
   an elongate stop bar disposed on the trap door, the stop bar having an angled extension on opposite ends;
   a cable connected at one end to a respective extension of the stop bar, the cable being disposed on each of the at least one pulleys; and
   a counterweight attached to the cable opposite the extension of the stop bar, the counterweights biasing the trap door in a closed position.

6. The bird carcass container according to claim 1, wherein the offset fulcrum further comprises a bracket actuator disposed at an angle with respect to the trap door.

7. The bird carcass container according to claim 6, wherein the bracket actuator further comprises:
   a substantially rectangular frame, one side of the frame being rigidly attached to the trap door at a point offset from the pivot; and
   an angled engaging member formed on a side of the rectangular frame opposite the trap door, the angled engaging member being adapted for being acted upon by an outside force to open the trap door.

8. The bird carcass container according to claim 1, wherein the trap door further comprises a drip cover disposed atop the trap door, the drip cover covering the outlet.

9. A bird carcass container, comprising:
   a closed container body having an inlet, an outlet, a front, a back, a bottom and sidewalls;
   a selectively actuated trap door disposed at the bottom of the container body in communication with the outlet, the trap door being rotatable about a pivot;
   a bias mechanism operatively attached to the trap door to retain the trap door in a closed position, wherein the biasing mechanism further comprises:
      i) at least one pulley attached to each of the sidewalls;
      ii) an elongate stop bar disposed on the trap door, the stop bar having an angled extension on opposite ends;
      iii) a cable connected at one end to a respective extension of the stop bar, the cable being disposed on each of the at least one pulleys; and
      iv) a counterweight attached to the cable opposite the extension of the stop bar, the counterweights biasing the trap door in a closed position; and
   an offset fulcrum lever attached to the trap door;
   wherein operation of the offset fulcrum lever forces the trap door open to retrieve contents of the container body for further processing.

10. A bird carcass container, comprising:
   a closed container body having an inlet, an outlet, a front, a back, a bottom and sidewalls;
   a selectively actuated trap door disposed at the bottom of the container body in communication with the outlet, the trap door being rotatable about a pivot;
   a bias mechanism operatively attached to the trap door to retain the trap door in a closed position; and
   an offset fulcrum lever attached to the trap door, the offset fulcrum further comprises a bracket actuator disposed at an angle with respect to the trap door, wherein the bracket actuator further comprises:
      i) a substantially rectangular frame, one side of the frame being rigidly attached to the trap door at a point offset from the pivot; and
      ii) an angled engaging member formed on a side of the rectangular frame opposite the trap door, the angled engaging member being adapted for being acted upon by an outside force to open the trap door;
   wherein operation of the offset fulcrum lever forces the trap door open to retrieve contents of the container body for further processing.

* * * * *